United States Patent
Asai et al.

(10) Patent No.: US 6,716,907 B2
(45) Date of Patent: Apr. 6, 2004

(54) PHENOLIC MOLDING COMPOSITION

(75) Inventors: Keiji Asai, Miyazaki (JP); Hirokazu Arai, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 279 days.

(21) Appl. No.: 10/026,472

(22) Filed: Dec. 27, 2001

(65) Prior Publication Data

US 2002/0123557 A1 Sep. 5, 2002

(30) Foreign Application Priority Data

Dec. 28, 2000 (JP) ...................... P2000-402847

(51) Int. Cl.[7] .............................. C08J 3/00; C08K 3/40; C08K 3/34; C08L 61/04; F16H 55/17
(52) U.S. Cl. ...................... 524/494; 524/492; 524/493; 524/508; 524/509; 524/511; 524/541; 524/594; 254/902; 74/434
(58) Field of Search ............................... 524/492, 493, 524/494, 508, 509, 511, 541, 594; 254/902; 74/434

(56) References Cited

U.S. PATENT DOCUMENTS 5,834,551 A 11/1998 Hataguchi et al.

FOREIGN PATENT DOCUMENTS

| EP | 0 590 233 A3 | 4/1994 |
|---|---|---|
| EP | 0 590 233 A2 | 4/1994 |
| EP | 0 794 361 A1 | 9/1997 |
| JP | 5-032863 | 2/1993 |
| JP | 9-217818 | 8/1997 |

OTHER PUBLICATIONS

Database WPI dated Feb. 9, 1993 European Search Report dated Mar. 21, 2002.

Primary Examiner—Patrick D. Niland
(74) Attorney, Agent, or Firm—McGinn & Gibb, PLLC

(57) ABSTRACT

A phenolic molding composition containing 40 to 100 parts by weight of inorganic fiber, 30 to 90 parts by weight of natural silica powder with a mean particle size of from 20 to 150 $\mu$m, and 1 to 15 parts by weight of a rubber component, as main components, in 100 parts by weight of resol-based phenolic resin. Preferably, the inorganic fiber contains 50% or more by weight of glass fiber. Further preferably, the natural silica powder is shaped like pulverized powder. A pulley is molded of a phenolic molding composition defined above.

8 Claims, No Drawings

PHENOLIC MOLDING COMPOSITION

BACKGROUND OF THE INVENTION

The present invention relates to a phenolic molding composition used in engine parts or the like mounted on a vehicle, and more particularly relates to a phenolic molding composition improved in wear resistance, especially in abrasive wear resistance, and a pulley molded of the composition.

Since phenolic molding compositions are superior in heat resistance and dimensional stability, they have been used as alternative materials to metal parts in various fields. In the field of vehicles, making various parts out of resin has been promoted with the increase in demand for reduction in size, weight and cost. Particularly, pulleys which have been heretofore chiefly made of metal are being replaced by those made of resin. Such resin pulleys have been molded with various shapes.

However, particularly in the case of a pulley made of phenolic resin, the contact surface of the pulley with a rubber belt is apt to wear out if the pulley is used in the state where dust is nipped between the pulley and the belt. Thus, there is a disadvantage that the resin pulley is inferior in durability compared to the general metal pulley. In order to prevent such dust from entering, An attempt on covering of the whole of an auxiliary driving portion of an engine with a cover is therefore considered. Such an attempt is, however, impractical because it is against the demand for reduction in weight and cost. Therefore, it is essential to improve the wear resistance, particularly the abrasive wear resistance of the pulley itself.

SUMMARY OF THE INVENTION

The pulley made of phenolic resin is easily cracked because of a difference in thermal expansion coefficient from a metal insert in the environment in which variations in temperature are violent. Therefore, there is a problem that the pulley is inferior in heat shock resistance.

Therefore, a resin pulley made of phenolic resin mixed with inorganic fiber, inorganic powder, organic fiber and elastomer has been proposed, for example, as described in Japanese Patent Laid-Open No. 217818/1997. Fine silica powder with an average particle diameter of 10 μm is used as the inorganic powder in such a resin pulley. In this case, there is a problem that the abrasive wear resistance is insufficient so that the abrasion loss of the pulley increases. Thus, further improvement has been demanded.

Taking the problems in the related art into consideration, the present inventors have made various researches. As a result, the present inventors have found that a molded product, particularly a pulley, is improved in wear resistance and heat shock resistance by compounding, in a phenolic resin molding composition, resol-based phenolic resin, inorganic fiber, silica powder with an average particle diameter of from 20 to 150 μm, and a rubber component in specific proportions. Thus, the invention has been accomplished.

In order to solve the aforesaid object, the invention is characterized by having the following arrangement.

(1) A phenolic molding composition comprising;
   a resol-based phenolic resin; and
   40 to 100 parts by weight of inorganic fiber;
   30 to 90 parts by weight of natural silica powder with an average particle diameter of from 20 to 150 μm; and
   1 to 15 parts by weight of a rubber component, each per 100 parts by weight of the resol-based phenolic resin.

(2) The phenolic molding composition according to (1), wherein the inorganic fiber includes 50% or more by weight of glass fiber.

(3) The phenolic molding composition according to (1) or (2), wherein the natural silica powder is shaped like pulverized powder.

(4) The resin pulley molded of a phenolic molding composition defined in any one of (1) to (3).

DETAILED DESCRIPTION OF PREFERRED EMBODIMENTS

A phenolic molding composition for forming a pulley according to the invention will be described below in detail.

A resol-based phenolic resin used in this invention may be dimethylene-ether-based or methylol-based and either of a solid type or of a liquid type. Especially, a solid type phenolic resin with an average molecular weight of from 600 to 800 may be used preferably in order to improve heat shock resistance. The resol-based phenolic resin has a function of uniformly dispersing a rubber component mixed as a stress absorber in this invention, further has a function of reducing molding pressure at the time of injection molding to reduce stress remaining in the pulley. Accordingly, the resol-based phenolic resin improves heat shock resistance.

In order to improve abrasive wear resistance which is an object of this invention, it is essential to increase hardness of additives and surface hardness of the composition and to reduce elastic modulus. From this point of view, a rubber component, inorganic fiber and silica powder are compounded in the molding composition according to this invention.

The rubber component used in this invention is not particularly limited but nitrile rubber, acrylic rubber, polychloroprene rubber, styrene-butadience rubber, silicone rubber or the like may be used preferably. One selected from these rubber components maybe used singly or two or more rubber components may be used in combination. Preferably, 1 to 15 parts by weight of the rubber component are contained in 100 parts by weight of phenolic resin. If the amount of the rubber component is smaller than 1 part by weight, the effect for reduction in elastic modulus cannot be exhibited. If the amount of the rubber component is larger than 15 parts by weight, the effect for reduction in elastic modulus can be obtained but improvement in abrasive wear resistance cannot be obtained because of extreme reduction in surface hardness and strength.

As the inorganic fiber used in this invention, it is possible to use glass fiber, carbon fiber, silicon carbide fiber, potassium titanate fiber or the like. One selected is from these materials maybe used singly or two or more materials may be used in combination. Especially, inorganic fiber containing not smaller than 50% by weight of glass fiber may be used preferably from the point of view of strength, heat resistance, cost, and soon. The glass fiber maybe preferably subjected to a surface treatment with a silane coupling agent in order to improve adhesion to the phenolic resin.

In this invention, 40 to 100 parts by weight of the inorganic fiber is contained in 100 parts by weight of the phenolic resin. If the amount of the inorganic fiber is smaller than 40 parts by weight, the reinforcing effect is poor in practical use of the pulley. If the amount of the inorganic fiber is larger than 100 parts by weight, the characteristic of attacking the rubber belt becomes high as well as the abrasive wear resistance becomes low because of increase in elastic modulus. Therefore, it is undesirable to determine the amount of the inorganic fiber which is smaller than 40 parts by weight or is larger than 100 parts by weight.

In this invention, natural silica powder with an average particle diameter of from 20 to 150 μm is used. In accordance with crystalline state, natural silica is classified into crystal silica and amorphous molten silica. Either of them maybe used. The shape of natural silica powder is classified into a pulverized type and a round grain type. Especially, the pulverized type natural silica powder may be preferably used because the frictional resistance due to mobility of the pulley prevents the silica powder from dropping out. If the average particle diameter of the natural silica powder is smaller than 20 μm, the contact surface area of the particles with the phenolic resin becomes small so that the particles are apt to drop out undesirably. If the average particle diameter is larger than 150 μm, the surface of the finished product is roughened so easily that the abrasive wear resistance becomes low undesirably.

Preferably, 30 to 90 parts by weight of the natural silica powder are contained in 100 parts by weight of the phenolic resin. If the amount of the natural silica powder is smaller than 30 parts by weight, a sufficient effect cannot be given to wear resistance because of shortage of the proportion of the silica powder on the surface of the pulley. If the amount of the silica powder is larger than 90 parts by weight, the adhesion between the phenolic resin and the silica powder is lowered because of relative reduction in the amount of resin so that the silica powder is apt to drop out of the surface of the pulley.

Various kinds of additives commonly used in the general phenolic molding composition, for example, releasants such as calcium stearate, accelerators such as magnesium oxide, anti-oxidants such as hindered phenol, light stabilizers such as hindered amine, ultraviolet light absorbers such as benzotriazole, and colorants, may be added to the molding composition according to the invention as occasion demands.

Further, organic fiber such as cotton cloth fiber, aramid fiber or the like can be added to the molding composition according to the invention if the organic fiber does not disturb the object of the invention.

The molding composition according to the invention can be produced by heating and kneading in a press kneader, a biaxial extruder, a Henschel mixer, a mixing heat roll or the like and by pulverizing in a power mill or the like. In addition, a pulley having a desired shape can be molded by a known molding method such as an injection molding method, a transfer molding method or a compression molding method.

EXAMPLES

Examples according to the invention will be described below but the invention is not limited these examples.

Incidentally, the respective characteristics measured were evaluated according to the following method.

(1) Spiral Flow

A molded product shaped like a spiral is obtained by transfer molding in the following condition. The length of the spiral thereof was made a spiral flow value.

Mold: 100 mm pot diameter, 18 mm pitch, 1000 mm length

Molding Condition; 165° C. mold temperature, 53 MPa molding pressure, 50 g sample (2) Bending Strength and Elastic Modulus in Flexure The bending strength and the elastic modulus in flexure was measured according to JIS-K6911.

(3) Charpy Impact Strength

The Charpy impact strength was measured according to JIS-K6911.

(4) Rockwell Hardness

The Rockwell hardness was measured according to JIS-K6911.

(5) Abrasive Wear Volume

The volume reduced up to 2000 rotations was measured in an abrasion test according to JIS-K7204.

(6) Pulley Dust Test (Pulley Wearing Characteristic and Belt Attacking Characteristic)

A pulley dust test was performed under the condition of 1 kg/$M^3$ dust, rotational speed of 0 to 7000 rpm and load of 980 N. After the pulley was made to run for 400 hours, the abrasion state of the pulley was checked. The case where no abrasion was not observed in the outer circumferential groove portion of the pulley which was a frictional surface against the rubber belt was estimated as O. The case where abrasion was observed was estimated as X. With respect to the characteristic of attacking the rubber belt, the case where the attacking characteristic was not observed was estimated as O. The case where the attacking characteristic was observed was estimated as X.

(7) Heat Shock Resistance

One cycle of −40° C. for 30 minutes and 120° C. for 30 minutes was repeated 1000 times. After the 1000 cycles, cracking was checked. The case where there was no cracking was estimated as O. The case where there was some cracking was estimated as X.

Example 1

After 100 parts by weight of dimethylene-ether-based resol resin [number-average molecular weight of 800, made by ASASHI ORGANIC CHEMICALS INDUSTRY CO., LTD.], 75 parts by weight of glass fiber [made by NIPPON ELCTRIC GALSS CO., LTD.], 65 parts by weight of natural silica powder [average particle diameter of 25 μm, pulverized shape, made by TATSUMORI LTD.], 12 parts by weight of nitrile rubber [PCN-38, made by JSR Corp.], 6 parts by weight of hydrated lime, 5 parts by weight of magnesium oxide and 5 parts by weight of zinc stearate were compounded and mixed homogeneously, the mixture was heated and kneaded evenly by a roll to thereby form a sheet-like mixture. After cooled, the mixture was pulverized by a power mill. Thus, a granular molding composition was produced.

The molding composition thus obtained was injection-molded under the following condition.

Cylinder Temperature: front 85° C., rear 50° C.

Mold Temperature: 180° C.

Curing Time: 60 seconds

Thus, a test piece for evaluation of performance and a pulley were produced.

With respect to the test piece thus obtained, the bending strength, the bending modulus of elasticity, the Charpy impact strength, the Rockwell hardness and the abrasive wear volume were measured. Further, with respect to the pulley thus obtained, the pulley wearing characteristic and the belt attacking characteristic were evaluated by a pulley dust test. In addition, the heat shock resistance was evaluated. Results of the measurement were shown in Table 1.

Examples 2 and 3 and Comparative Examples 1 to 6

A test piece and a pulley were produced after a molding composition was produced in the same manner as in Example 1 except that the mixture proportions were changed as shown in Table 1. The performance was evaluated. Results of the measurement were shown in Table 1.

TABLE 1

| | Ex. 1 | Ex. 2 | Ex. 3 | Com. 1 | Com. 2 | Com. 3 | Com. 4 | Com. 5 | Com. 6 |
|---|---|---|---|---|---|---|---|---|---|
| Dimethylene-ether-based resol resin | 100 | 100 | 100 | 100 | 100 | 100 | 100 | — | 100 |
| Novolac-based phenolic resin | — | — | — | — | — | — | — | 100 | — |
| Glass fiber | 75 | 75 | 75 | 75 | 75 | 100 | 75 | 75 | 75 |
| Cotton cloth fiber | — | — | — | — | — | — | — | — | 15 |
| Natural silica powder (particle diameter 25 μm) | 65 | — | — | — | — | 20 | — | — | — |
| Natural silica powder (particle diameter 50 μm) | — | 65 | — | — | — | — | 65 | 65 | — |
| Natural silica powder (particle diameter 130 μm) | — | — | 65 | — | — | — | — | — | — |
| Natural silica powder (particle size 10 μm) | — | — | — | 65 | — | — | — | — | 30 |
| Natural silica powder (particle size 250 μm) | — | — | — | — | 65 | — | — | — | — |
| Nitrile rubber | 12 | 12 | 12 | 12 | 12 | 12 | 0.5 | 12 | 10 |
| Hydrated lime | 6 | 6 | 6 | 6 | 6 | 6 | 6 | — | 6 |
| Magnesium oxide | 5 | 5 | 5 | 5 | 5 | 5 | 5 | 5 | 5 |
| Zinc stearate | 5 | 5 | 5 | 5 | 5 | 5 | 5 | 5 | 5 |
| Hexamethylene tetramine | — | — | — | — | — | — | — | 13 | — |
| Spiral flow (mm) | 380 | 380 | 420 | 310 | 440 | 370 | 460 | 540 | 350 |
| Bending strength (MPa) | 162 | 156 | 138 | 159 | 118 | 178 | 164 | 168 | 168 |
| Bending modulus of elasticity | 10.500 | 10.800 | 10.800 | 11.500 | 10.300 | 11.300 | 15.300 | 12.000 | 10.500 |
| Charpy impact strength (KJ/m$^2$) | 4.7 | 4.2 | 3.4 | 4.5 | 2.5 | 4.3 | 2.9 | 3.8 | 4.2 |
| Rockwell hardness (M scale) | 97 | 97 | 98 | 96 | 95 | 98 | 113 | 101 | 98 |
| Abrasive wear volume (mm$^3$) | 33.4 | 25.8 | 34.5 | 63.7 | 68.9 | 61.2 | 53.3 | 32.6 | 52.2 |
| Pulley dust test — Pulley wearing characteristic | ○ | ○ | ○ | X | X | X | X | ○ | X |
| Pulley dust test — Belt attacking characteristic | ○ | ○ | ○ | ○ | ○ | ○ | ○ | ○ | ○ |
| Heat shock resistance | ○ | ○ | ○ | ○ | ○ | ○ | X | X | ○ |

From results of Table 1, it was confirmed that the molded product using the phenolic molding composition according to the invention was excellent in abrasive wear resistance because the abrasive wear volume in each of Examples 1 to 3 was reduced greatly to a value of from about 40% to about 60% as large as that in each of Comparative Examples 1 to 6 and because abrasion was not observed in Examples 1 to 3 in the pulley dust test. In addition, it was confirmed that the molded product using the phenolic molding composition according to the invention was excellent in heat shock resistance because there was no cracking in the molded product in the heat shock resistance test.

On the other hand, each of Comparative Example 1 in which natural silica with a small mean particle size of 10 μm was used and Comparative Example 2 in which natural silica with a large mean particle size of 250 μm was used, the abrasive wear resistance was poor because the abrasive wear volume was large so that abrasion was observed in the pulley dust test. In Comparative Example 3 in which the loading of natural silica was reduced, the abrasive wear resistance was worsened. In Comparative Example 4 in which the loading of nitrile rubber was reduced, the heat shock performance was worsened. In Comparative Example 5 in which the resol resin was replaced by novolac-based phenolic resin, the abrasive wear resistance was excellent but the heat shock resistance was poor. In Comparative Example 6 in which natural silica with an average particle diameter of 10 μm and cotton cloth fiber were used, the strength was excellent but both the spiral flow characteristic and the abrasive wearability were inferior and particularly the pulley wearing characteristic was poor.

As described above, the phenolic molding composition according to the invention is excellent in abrasive wear resistance and heat shock resistance. In addition, a molded product further excellent in mechanical strength can be obtained. Hence, the phenolic molding composition is extremely suitable particularly as a pulley material.

What is claimed is:

1. A phenolic molding composition comprising:

a resol-based phenolic resin; and 40 to 100 parts by weight of inorganic fiber;

30 to 90 parts by weight of natural silica powder with an average particle diameter of from 20 to 150 μm; and 1 to 15 parts by weight of a rubber component, each per 100 parts by weight of the resol-based phenolic resin.

2. The phenolic molding composition according to claim 1, wherein the inorganic fiber includes 50% or more by weight of glass fiber.

3. The phenolic molding composition according to claim 1, wherein the natural silica powder is shaped like pulverized powder.

4. The phenolic molding composition according to claim 2, wherein the natural silica powder is shaped like pulverized powder.

5. A resin pulley molded of a phenolic molding composition defined in claim 1.

6. A resin pulley molded of a phenolic molding composition defined in claim 2.

7. A resin pulley molded of a phenolic molding composition defined in claim 3.

8. A resin pulley molded of a phenolic molding composition defined in claim 4.

* * * * *